(12) United States Patent
Kataoka et al.

(10) Patent No.: US 8,289,822 B2
(45) Date of Patent: Oct. 16, 2012

(54) OPTICAL DISC REPRODUCING APPARATUS FOR IMPLEMENTING AN OPTICAL RECORDING AND REPRODUCING METHOD FOR MULTI-LAYER OPTICAL DISCS

(75) Inventors: Takeyoshi Kataoka, Yokohama (JP); Yoshinori Ishikawa, Yokohama (JP); Yutaka Nagai, Yokohama (JP); Kenji Akahoshi, Yokohama (JP); Takakiyo Yasukawa, Fujisawa (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/769,477

(22) Filed: Apr. 28, 2010

(65) Prior Publication Data

US 2011/0051589 A1    Mar. 3, 2011

(30) Foreign Application Priority Data

Aug. 28, 2009  (JP) ................. 2009-197588
Sep. 24, 2009  (JP) ................. 2009-218412

(51) Int. Cl.
*G11B 21/08* (2006.01)
(52) U.S. Cl. .................. 369/30.04; 369/53.2
(58) Field of Classification Search ............. None
See application file for complete search history.

(56) References Cited

U.S. PATENT DOCUMENTS

| | | |
|---|---|---|
| 6,295,260 B1 | 9/2001 | Shihara et al. |
| 6,304,536 B1 | 10/2001 | Yamada et al. |
| 2004/0257961 A1 | 12/2004 | Nishi et al. |
| 2006/0023622 A1 | 2/2006 | Suh |
| 2007/0002699 A1 | 1/2007 | Suh |
| 2007/0042294 A1 | 2/2007 | Sugaya et al. |
| 2007/0121429 A1 | 5/2007 | Nakahara et al. |

FOREIGN PATENT DOCUMENTS

| | | |
|---|---|---|
| EP | 1746597 A2 | 1/2007 |
| EP | 226798 A2 | 8/2010 |
| JP | 2008-508658 A | 3/2008 |

OTHER PUBLICATIONS

European Patent Office Search Report for application EP10250828.0 ( Oct. 26, 2010).
International Search Report for European Patent Office application EP10250828 (Feb. 25, 2011).

*Primary Examiner* — Paul Huber
(74) *Attorney, Agent, or Firm* — Kilpatrick Townsend & Stockton LLP

(57) ABSTRACT

Where a hybrid disc has different types of media, the light spot moves among recording layers of the different media, after loading the disc into an optical disc apparatus, there is a problem that information on a media type of each recording layer should be recorded in DI etc. of the optical disc. Detailed information on the hybrid disc is stored in DI, by changing a disc layer type identifier or a disc structure in DI such as BCA or PIC on the optical disc.

10 Claims, 11 Drawing Sheets

|  | byte | BD-RE/SL | BD-ROM/DL |
|---|---|---|---|
| DISC LAYER TYPE IDENTIFIER | 3 | BDW | BDO |
| DISK STRUCTURE | 1 | SL/RE | DL/ROM |

|  | byte | DI BD-RE | DI BD-ROM | BCA |
|---|---|---|---|---|
| DISC LAYER TYPE IDENTIFIER | 3 | WO3 | WO3 | WO3 |
| DISK STRUCTURE | 1 | SL/RE | DL/ROM | TL/RE+ROM |

|  | byte | DI BD-ROM | DI BD-RE | BCA |
|---|---|---|---|---|
| DISC LAYER TYPE IDENTIFIER | 3 | OW3 | OW3 | OW3 |
| DISK STRUCTURE | 1 | SL/ROM | DL/RE | TL/RE+ROM |

FIG.5

|  | byte | DI BD-RE | DI BD-ROM | BCA |
|---|---|---|---|---|
| DISC LAYER TYPE IDENTIFIER | 3 | BW1 | BO2 | BH3 |
| DISK STRUCTURE | 1 | TL/RE+ROM | TL/RE+ROM | TL/RE+ROM |

FIG.6

|  | byte | DI BD-RE | DI BD-ROM | BCA |
|---|---|---|---|---|
| DISC LAYER TYPE IDENTIFIER | 3 | WB1 | BO2 | WO3 |
| DISK STRUCTURE | 1 | TL/RE+ROM | TL/RE+ROM | TL/RE+ROM |

FIG.7

|  | byte | DI BD-RE | DI BD-ROM | BCA |
|---|---|---|---|---|
| DISC LAYER TYPE IDENTIFIER | 3 | BDW | BDO | BH3 |
| DISK STRUCTURE | 1 | TL/RE+ROM | TL/RE+ROM | TL/RE+ROM |
| RECORDING LAYER IDENTIFIER INFORMATION | 2 | L0:RE<br>L1:ROM<br>L2:ROM | L0:RE<br>L1:ROM<br>L2:ROM | L0:RE<br>L1:ROM<br>L2:ROM |

FIG.8

|  | byte | DI BD-RE | DI BD-ROM | BCA |
|---|---|---|---|---|
| DISC LAYER TYPE IDENTIFIER | 3 | BW1 | bo2 | BH3 |
| DISK STRUCTURE | 1 | TL/RE+ROM | TL/RE+ROM | TL/RE+ROM |

|  | byte | DI BD-RE | DI BD-ROM | BCA |
|---|---|---|---|---|
| DISC LAYER TYPE IDENTIFIER | 3 | WO1 | WO2 | WO3 |
| DISK STRUCTURE | 1 | TL/RE | TL/ROM | TL/RE+ROM |

|  | byte | DI BD-ROM | DI BD-RE | BCA |
|---|---|---|---|---|
| DISC LAYER TYPE IDENTIFIER | 3 | OW1 | OW2 | OW3 |
| DISK STRUCTURE | 1 | TL/ROM | TL/RE | TL/RE+ROM |

FIG.17

|  | byte | DI BD-R | DI BD-RE | DI BD-ROM | BCA |
|---|---|---|---|---|---|
| DISC LAYER TYPE IDENTIFIER | 3 | RX1 | RX2 | RX1 | RX4 |
| DISK STRUCTURE | 1 | QL/R | QL/RE | QL/ROM | QL/R+RE+ROM |

FIG.18

|  | byte | DI BD-R | DI BD-RE | DI BD-ROM | BCA |
|---|---|---|---|---|---|
| DISC LAYER TYPE IDENTIFIER | 3 | RX4 | RX4 | RX4 | RX4 |
| DISK STRUCTURE | 1 | SL/R | DL/RE | SL/ROM | QL/R+RE+ROM |

FIG.19

|  | byte | DI BD-R | DI BD-RE | DI BD-ROM | BCA |
|---|---|---|---|---|---|
| DISC LAYER TYPE IDENTIFIER | 3 | K1Q | K2Q | K3Q | BKQ |
| DISK STRUCTURE | 1 | SL/R | DL/RE | SL/ROM | QL/R+RE+ROM |

FIG.20

|  | byte | DI BD-R | DI BD-RE | DI BD-ROM | BCA |
|---|---|---|---|---|---|
| DISC LAYER TYPE IDENTIFIER | 3 | K1S | K2D | K3S | BKQ |
| DISK STRUCTURE | 1 | QL/R+RE+ROM | QL/R+RE+ROM | QL/R+RE+ROM | QL/R+RE+ROM |

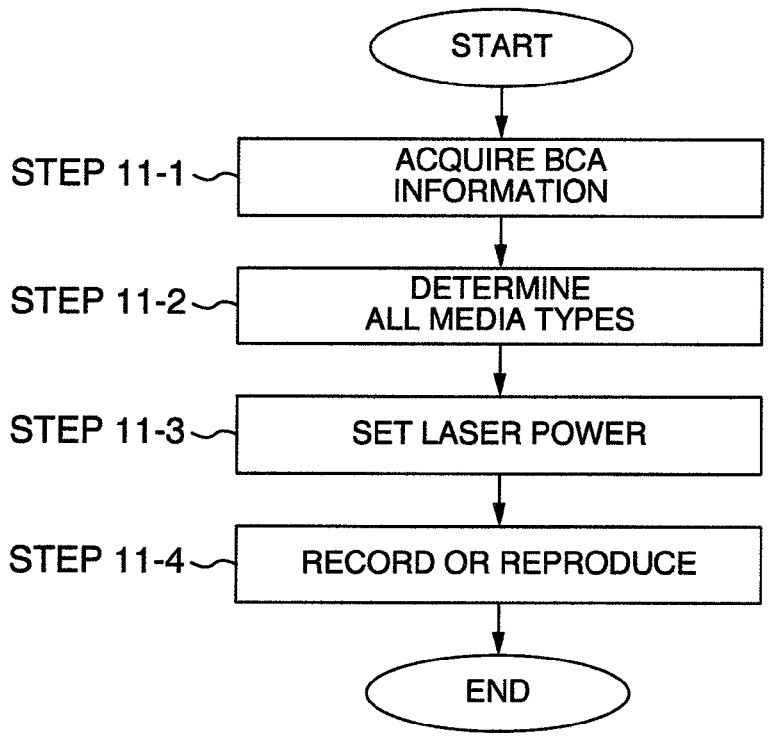
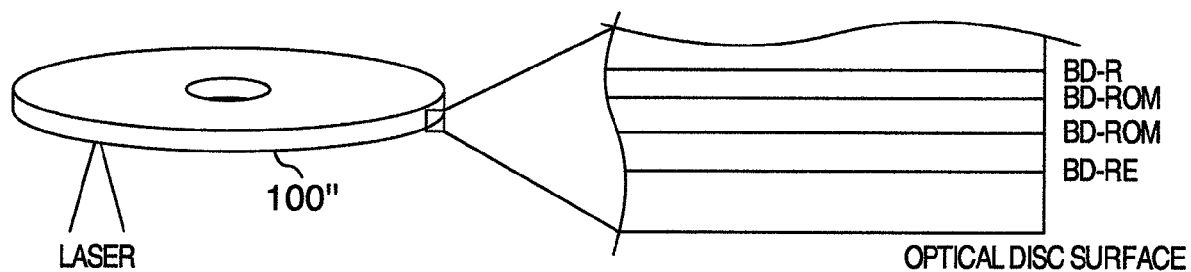

| | byte | DI BD-R | DI BD-RE | DI BD-ROM | BCA |
|---|---|---|---|---|---|
| DISC LAYER TYPE IDENTIFIER | 3 | BRS | BWD | BOS | BDH |
| DISK STRUCTURE | 1 | QL/R+RE+ROM | QL/R+RE+ROM | QL/R+RE+ROM | QL/R+RE+ROM |

OPTICAL DISC REPRODUCING APPARATUS FOR IMPLEMENTING AN OPTICAL RECORDING AND REPRODUCING METHOD FOR MULTI-LAYER OPTICAL DISCS

INFORMATION BY REFERENCE

The present application claims priority from Japanese application JP2009-197588 filed on Aug. 28, 2009 and JP2009-218412 filed on Sep. 24, 2009, the entire content of which is hereby incorporated by reference into this application.

BACKGROUND OF THE INVENTION

The present invention relates to an optical disc, an optical disc reproducing apparatus, an optical disc apparatus, a reproducing method and a recording method.

A hybrid disc having reproducing layers of both DVD and BD (Blu-ray Disc) is now sold on the market. The medium of the hybrid disc is determined to be either one after the disc is loaded into an optical disc apparatus. Once the medium is determined depending on the optical disc apparatus, however, operation continues hereafter only as the determined medium, until a media change instruction is issued from a controller to control the optical disc apparatus.

In addition, information on a disc media type is recorded on the optical disc. JP-A-2008-508658 describes that DI (disc information) is recorded in an area called PIC, and that a media type, a class and a version are defined therein.

SUMMARY OF THE INVENTION

Where one disc has recording layers of different media types and a light spot moves among recording layers of the different media types after the disc is loaded into an optical disc apparatus, there is a problem that information on media types of the layers should be recorded in DI of the optical disc or the like. In addition, there is a problem that based on the information, the optical disc apparatus should judge on which layer the light spot is now focusing, etc.

In particular, the more layers the optical disc has, the more serious this problem becomes.

In addition, in the focus jump where the light spot moves among recording layers, there is a problem that it should be determined whether a recording layer to which the light spot moves is the layer of a desired type or not.

It is an object of the present invention, for example, to provide an optical disc or an optical disc apparatus such that a layer configuration of said optical disc can be determined where the optical disc has layers of a plurality of different types.

The above object can be achieved, for example, by a configuration described in the claims. The above object can also be achieved, for example, by the following means:

in the optical disc having recording layers of a plurality of media types, at least one layer among all recording layers prerecords as disc information, the number of the recording layers of each media type, and the number of all recording layers of said optical disc.

According to the present invention, it becomes possible to provide, for example, the optical disc which has different layers of a plurality of types, or the optical disc apparatus such that a layer configuration of said optical disc can be determined.

BRIEF DESCRIPTION OF THE DRAWINGS

These and other features, objects and advantages of the present invention will become more apparent from the following description when taken in conjunction with the accompanying drawings, wherein:

FIG. 5 shows an example of a disc layer type identifier and a disc structure (Embodiment 3).
FIG. 6 shows an example of a disc layer type identifier and a disc structure (Embodiment 4).
FIG. 7 shows an example of a disc layer type identifier and a disc structure (Embodiment 5).
FIG. 8 shows an example of a disc layer type identifier and a disc structure (Embodiment 6).
FIG. 17 shows an example of a disc layer type identifier and a disc structure (Embodiment 12).
FIG. 18 shows an example of a disc layer type identifier and a disc structure (Embodiment 13).
FIG. 19 shows an example of a disc layer type identifier and a disc structure (Embodiment 14).
FIG. 20 shows an example of a disc layer type identifier and a disc structure (Embodiment 15).
FIG. 22 is a flow chart showing an example of recording processing or reproducing processing (Embodiment 17).
FIG. 23 shows an example of a recording layer of an optical disc (Embodiment 12).

DETAILED DESCRIPTION OF PREFERRED EMBODIMENTS

Embodiments will be explained below using drawings.

Embodiment 1

DI (Disc Information) contains a variety of information for recording and reproducing operation of the optical disc. In general, disc information is prerecorded in a predetermined part of an optical disc comprising an area called BCA (Burst Cutting Area) cut with laser by a manufacturer or author of the optical disc, or is contained in a PIC (Permanent Information & Control data) area or in wobble shape of a recording track.

The disc information contains a disc layer type identifier and a disc structure (BD structure). The disc layer type identifier is composed of three bytes and represents a media type of a layer which records said disc structure. In addition, the disc structure represents the number of recording layers and characteristics of the recording layers. In the present description, the disc layer type identifier may also be called disc layer type identifier information. In the present description, the disc structure may also be called disc structure information. In addition, it is assumed that in the present description, the recording layer includes not only a recordable layer which is writable once or rewritable, but also a layer for reproduction only in which user data or the like is already recorded at the manufacture of the medium and not writable once, etc. In addition, for example, the recording layer is a layer other than a cover layer. In addition, for example, the recording layer is a layer other than a spacer layer.

Figures 1, 2, 3, 4:
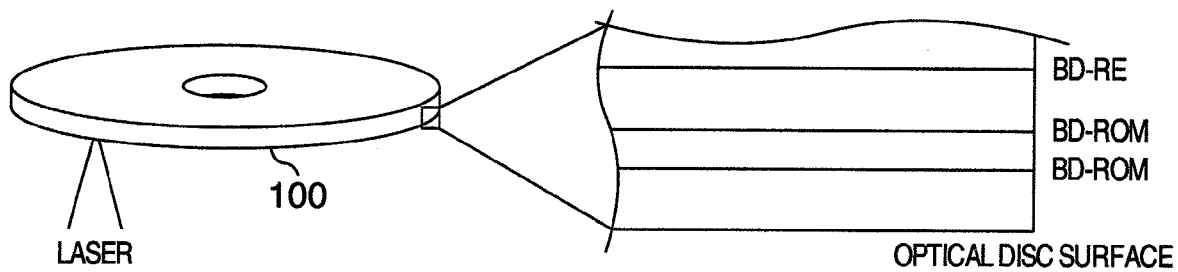
FIG. 1 shows an example of a disc layer type identifier and a disc structure (Embodiment 1).
FIG. 2 shows an example of a recording layer of an optical disc (Embodiment 1).
FIG. 3 shows an example of a disc layer type identifier and a disc structure (Embodiment 1).
FIG. 4 shows an example of a disc layer type identifier and a disc structure (Embodiment 2).

FIG. 1 shows the disc layer type identifier and the disk structure, in the case of one-layered BD-RE (REwritable) and two-layered BD-ROM (Read Only Memory). In the case of one-layered BD-RE, "BDW" contained in the disc layer type identifier indicates BD-RE, and "SL/RE" contained in the disc structure represents that the recording layer is SL (single layer), and that said recording layer is RE. In the case of two-layered BD-ROM, "BDO" in the disc layer type identifier indicates BD-ROM, and "DL/ROM" in the disc structure represents that the recording layers are DL (double layers) and that the recording layers are ROM. This same DI information is recorded both in PIC and in BCA.

However, for example, where one optical disc has layers of a plurality of media types, this DI information can represent neither what are media types of layers which the optical disc has, nor how many layers of each media type there are, and how many layers there are in total.

Accordingly, in the present Embodiment, the above problems are solved by creating a new information format to record the disc layer type identifier and the disk structure on the optical disc.

In the present Embodiment, the optical disc having a plurality of BD media is considered. BD includes BR-ROM for reproduction only, BD-R which can record once for one track, and BD-RE which can record repeatedly in one track, and one optical disc is considered here which has recording layers of at least two or more media types among them. Here, the media type indicates, for example, characteristics such as whether the recording layer is for reproduction only, writable once or rewritable;

whether recording density of the recording layer is equivalent to BD or DVD;

whether recording density of the recording layer is equivalent to BD with 23 GB or higher than 23 GB; or whether the recording layer is writable once or rewritable.

Without limiting to configuration examples illustrated above, it may also be an optical disc having one or more first type layers, and one or more second type layers different from the above first type layers. For example, the optical disc may have a plurality of layers with different recording density, such as the first type layer which is a DVD layer and the second type layer which is a BD layer. The optical disk may also have the first type layer which is for reproduction only and the second type layer which is writable once or rewritable. An optical disc may also have layers of a plurality of types different in physical specification of a user data area.

Here, FIG. 2 shows an optical disc 100 having one recording layer of BD-RE, and two recording layers of BD-ROM. This is the optical disc 100, where information can be recorded and reproduced by irradiating laser from the lower side of the drawing, and the arrangement order of those recording layers is BD-RE/BD-ROM/BD-ROM from the back of the disc to the surface thereof.

It is assumed that BCA is recorded only in the farthest recording layer BD-RE from the disc surface, and that PIC is recorded in at least one recording layer among the recording layers of each medium. It is also assumed that DI of PIC is contained in the wobble of the recording track in the recording layer.

In addition, each recording layer records user data, or is provided with a user data area in which user data can be recorded.

Next, FIG. 3 shows a disc layer type identifier and a disc structure of the present Embodiment.

It is assumed that both in BCA and in PIC, the disc layer type identifier is "WO3". "W" represents BD-RE, "O" represents BD-ROM, and "3" represents that the number of all recording layers of said optical disc is three. It should be noted that this "3" may be "T", etc. of TL (triple layers). Similarly, ASCII codes defined otherwise may be used, such as "S" for "1", "D" for "2", etc.

That is, in the present optical disc, the disc layer type identifier of a certain recording layer contains information indicating what is a media type of said layer, information indicating what are media types of other recording layers, and information indicating the total number of all recording layers.

On the other hand, the disc structure is different in PIC and BCA. It is assumed that the disc structure is "SL/RE" in PIC of the recording layer BD-RE, and "DL/ROM" in PIC of the recording layer BD-ROM. On the other hand, it is assumed that the disc structure in BCA is "TL/RE+ROM". Information in PIC represents the number of recording layers and a media type of each medium, and information in BCA represents the number of all recording layers and types of all media. Specifically, in BCA, TL (triple layers) represents that the total number of recording layers is three, and RE+ROM represents that there are both media of RE and ROM.

That is, in the present optical disc, the disc structure in PIC of a certain recording layer contains information indicating what is a media type of said layer, and information indicating how many recording layers having the same media type there are.

In addition, in the present optical disc, the disc structure in BCA contains information indicating the number of all recording layers of the optical disc, and information indicating what are media types of recording layers which said optical disc has.

Herewith, the optical disc apparatus can know all configurations of the loaded optical disc, by reading BCA or PIC. In addition, even where BCA or PIC cannot be reproduced due to flaw or stain thereof, all configurations of said disc can be known if any of them can be read.

Here, the optical disc of FIG. 2 records BCA only in the farthest recording layer from the disc surface, but where at least one BCA is recorded in the recording layers of each medium, the same information as that in PIC may be recorded in DI of BCA.

It should be noted that an example of two media types was explained in the present Embodiment, but it is applicable even to the case of three or more types.

Embodiment 2

The optical disc 100 having the arrangement order of recording layers was described in Embodiment 1, which is BD-RE/BD-ROM/BD-ROM from the back of the disc to the surface thereof.

The optical disc 100 having the arrangement order of recording layers will be explained in the present Embodiment, which is BD-ROM/BD-RE/BD-RE from the back of the disc to the surface thereof.

FIG. 4 shows a disc layer type identifier and a disc structure of the present Embodiment.

In the optical disc of the present Embodiment, information contained in the disc layer type identifier is different from Embodiment 1, as for the arrangement order of the recording layer of each media type in a layer thickness direction in the optical disc.

It is assumed that the disc layer type identifier is "OW3" both in BCA and in PIC. It is the same as in Embodiment 1 that "W" represents BD-RE, "O" represents BD-ROM, and "3" represents that the number of all recording layers of said optical disc is three, but the order of "W" and "O" is different.

By representing the arrangement order of the media types from the back of the disc to the surface thereof, characteristics of said optical disc can be given in more detail. It should be noted that the farthest recording layer from the surface described here means the recording layer positioned at the farthest from the optical pickup when the optical disc is loaded into the optical disc apparatus.

In addition, in the above example, a configuration is shown that the nearer to the back surface the recording layer of a certain media type is positioned, the higher rank byte in the disc layer type identifier is assigned to a byte indicating the media type. However, the present invention is not limited thereto, and the nearer to the front surface the recording layer of the certain media type is positioned, the higher rank byte in the disc layer type identifier may also be configured to be assigned to the byte indicating the media type.

It should be noted that the disc structure is the same, for example, as that in Embodiment 1.

Embodiment 3

The present Embodiment is an example where the disc layer type identifier and the disc structure different from Embodiment 1 are applied to the optical disc shown in FIG. 2.

FIG. 5 shows the disc layer type identifier and the disc structure of the present Embodiment.

The disc layer type identifier of the present Embodiment differs in PIC and BCA. Firstly, the disc layer type identifier in PIC will be explained.

It is assumed that the disc layer type identifier is "BW1" in PIC of the recording layer BD-RE, "BO2" in PIC of the recording layer BD-ROM, and "BH3" in BCA. Information of PIC represents each media type and the number of the recording layers and information in BCA represents that said optical disc is a hybrid disc, and the number of all recording layers. In the above case, "W" represents BD-RE, "O" represents BD-ROM, "H" represents a hybrid disc and a numeral such as "3" represents that the number of all recording layers of said optical disc is three. This "3" may also be "T", etc. representing triple layers. In addition, "B" is B of BD, but it is not especially limited thereto.

That is, the disc layer type identifier in PIC of a certain recording layer contains information indicating a media type of said recording layer and information indicating the number of said recording layers thereof.

In addition, the disc layer type identifier in BCA contains information indicating that the disk has the recording layers of a plurality of media types, and the number of all recording layers.

On the other hand, it is assumed that the disc structure is "TL/RE+ROM" both in BCA and in PIC. "TL" represents that the number of all recording layers of said optical disc is three, and "RE+ROM" represents that the recording layers of said optical disc are a combination of BD-RE and BD-ROM.

That is, the disc structure contains information indicating the number of all recording layers, and information indicating a media type of each recording layer.

Here, as a method for representing RE+ROM in the disk structure, it is considered a method for assuming that three bits in 1-byte information represent ROM, R and RE, respectively, and media corresponding to bits of "1" among them are used as recording layers of said optical disc.

The present Embodiment can deal with even the case where the number of the media is equal to three or more by representing media of all recording layers in the disc structure.

Embodiment 4

As for the optical disc shown in FIG. 2, the disc layer type identifier and the disc structure in the present Embodiment is different from Embodiment 1. Using Embodiment 4, an example where only the disc layer type identifier is different from the Embodiment 3 will be explained.

FIG. 6 shows a disc layer type identifier and a disc structure of the present Embodiment.

The disc layer type identifier is different in PIC and BCA, and it is assumed that the disc structure in PIC is "WB1" in PIC of the recording layer BD-RE, "BO2" in PIC of the recording layer BD-ROM, and that the disc structure is "WO3" in BCA. Information in PIC represents not only the number and the type of the recording layers of each medium but also the position in the optical disc of the media type layers by means of the position therein of a character or information representing characteristics or type of the medium. Because in the optical disc of FIG. 2, the arrangement order of the recording layers is BD-RE/BD-ROM from the back of the disc to the surface thereof, FIG. 6 shows that the disc layer type identifier is "WB1" in PIC of BD-RE. Information in BCA represents the arrangement order of the recording layers from the back of the disc to the surface thereof in the same way as in Embodiment 3.

In addition, in the above example, at the farther side to the disc surface a certain recording layer is positioned, the higher rank byte is assigned to a character or information representing the media type. However, the present invention is not limited thereto, and at the farther side to the disc surface, a certain recording layer is positioned, the lower rank byte may be assigned to a character or information representing the media type.

In addition, for example, the character B or the numeral representing the number of layers thereof, etc. may be used as information indicating position of the recording layers. That is, the position in the disc layer type identifier of a byte code such as the character "B", which is commonly assigned to the disc layer type identifier of each media type, may correspond to the arrangement order in the optical disc of the recording layers of the certain media type. The position in the disc layer type identifier of a byte code indicating the number of certain media type, may also correspond to the arrangement order in the optical disc of the recording layer of said media type.

It should be noted that the disc structure is the same, for example, as in Embodiment 3.

According to the present Embodiment, the optical disc can record characteristics thereof in more detail. In addition, the optical disc apparatus can acquire characteristics of the optical disc in more detail.

Embodiment 5

Using the present Embodiment, a method different from ones described using Embodiments 1, 3 and 4 applied to the optical disc shown in FIG. 2 will be illustrated.

A new memory area is secured in DI, and recording layer identifier indicating a type of each recording layer is newly defined.

FIG. 7 shows the disc layer type identifier, the disc structure, and the recording layer identifier of the present Embodiment. In all recording layers, the recording layer identifier L0 indicates BD-RE, the recording layer identifier L1 indicates BD-ROM, and the recording layer identifier L2 indicates BD-ROM.

Describing in more detail, two bytes as for the recording layer identifier are divided by every 2 bits to form 8 groups. Further, for example, by defining the 2 bits configuring each group as 00=ROM, 01=R and 10=RE, each group can indicate a type of each recording layer.

By adding this to both PIC and BCA, media types of all recording layers can be known.

In this way, the optical disc of the present Embodiment is provided with the data area, and the management information area to record disc information and the disc structure, by which an apparatus to record or reproduce data can specify characteristics of the recording media, and recording layer information. And, the recording layer information contains information on media types of all recording layers which the optical disc has.

According to the present Embodiment, the optical disc can record characteristics thereof in more detail. In addition, the optical disc apparatus can acquire characteristics of the optical disc in more detail.

Embodiment 6

Using the present Embodiment, a method different from ones described using Embodiments 1, 3, 4, and 5 applied to the optical disc shown in FIG. 2 will be illustrated.

FIG. 8 shows the disc layer type identifier and the disc structure of the present Embodiment.

The disc layer type identifier in PIC differs depending on a media type, and it is assumed that the disc layer type identifier is "BW1" in PIC of the recording layer of BD-RE, and "bo2" in PIC of the recording layer of BD-ROM. Whether to be capital letters or small letters represents the position in the optical disc of layers having the media type. In the optical disc of FIG. 2, the arrangement order of recording layers is BD-RE/BD-ROM from the back of the disc to the surface thereof, and the arrangement order of the ASCII codes is capital letters/small letters. The arrangement order of the ASCII codes may also be capital letters/small letters.

It is assumed that the disc layer type identifier in BCA is "BH3", for example, in the same way as that in Embodiment 3.

In addition, it is assumed that the disc structure is "TL/RE+ROM" both in BCA and in PIC, for example, in the same way as that in Embodiment 3.

Embodiment 7

The structure of the optical disc has been explained in the above Embodiments. The optical disc apparatus to record or reproduce on/from the above optical disc will be explained in the present Embodiment. Even in the case of either recording or reproducing information, the optical disc apparatus is necessary to access to a predetermined recording layer. And, the optical disc apparatus of the present Embodiment performs the access by acquiring the disc layer type identifier or the disc structure or recording layer information described using any of the above Embodiments 1 to 6. In addition, the optical disc apparatus of the present Embodiment acquires the disc layer type identifier or the disc structure in set-up processing when loading the optical disc.

Figure 9:
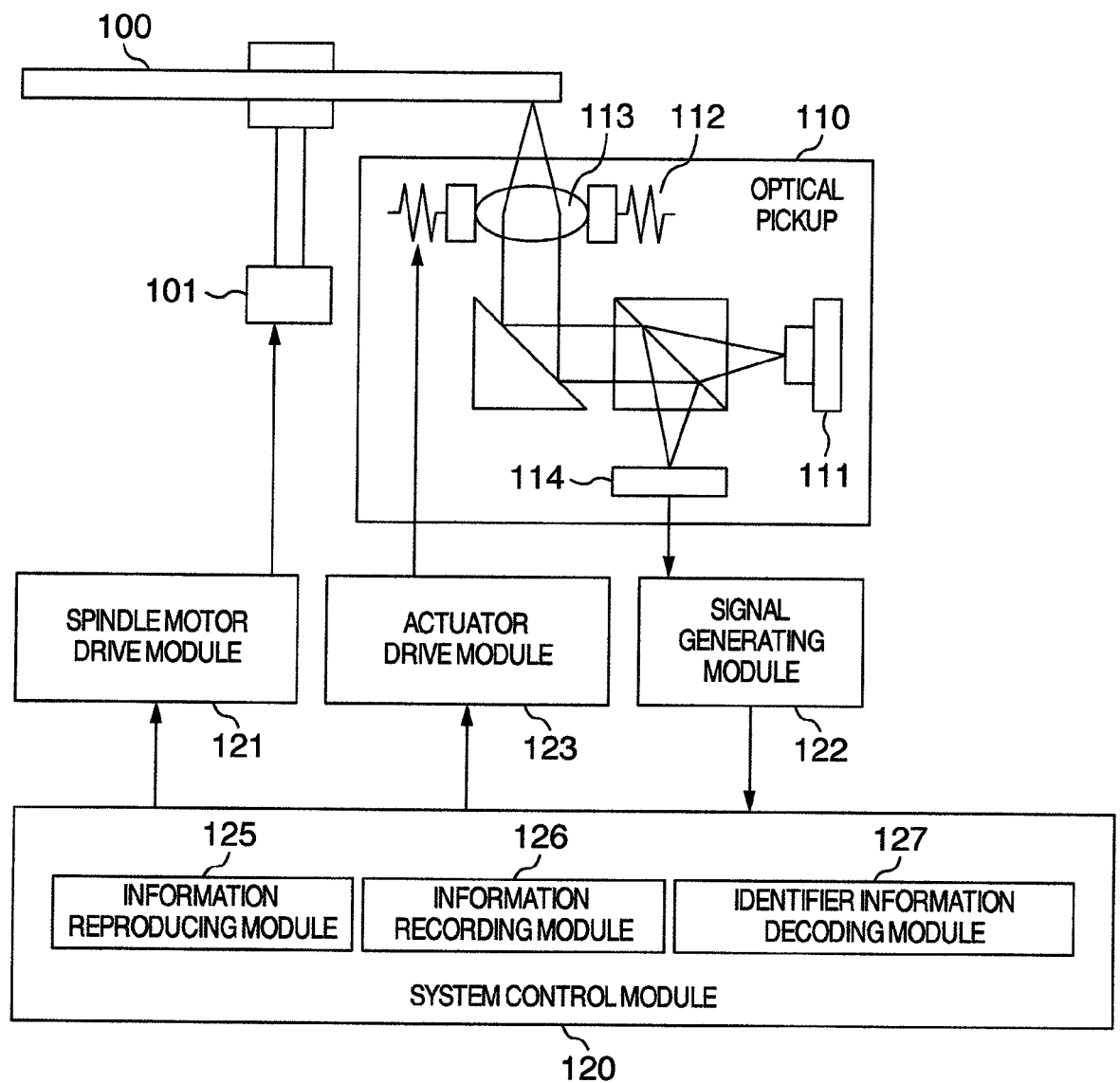
FIG. 9 is a block diagram showing a configuration example of an optical disc apparatus (Embodiment 7).

FIG. 9 is a block diagram showing a configuration of an optical disc apparatus of the present Embodiment.

The optical disc 100 has a plurality of recording layers of two or more media types, and information is read, erases and written by irradiating laser light from an optical pickup 110, as well as it is rotated by a spindle motor 101 driven by a spindle motor drive module 121 receiving a spindle motor drive signal from a system control module 120, which comprises an information reproducing module 125, an information recording module 126, and an identifier information decoding module 127.

A laser light emitted from a semiconductor laser 111 is focused as a light spot on an information recording surface of the optical disc 100 by an objective lens 113 moved by an actuator 112, and reflected on the information recording surface of the optical disc 100, and detected by a light detector 114.

A reproduced signal of information recorded in the optical disc 100, and an error signal for servo control is generated by a signal generating module 122 from a signal detected by the light detector 114. The error signal for servo control is a push-pull signal by a push-pull scheme, a DPD signal by a phase difference scheme, or the like, and represents a tracking error signal.

The information reproducing module 125 in the system control module 120 reproduces information of the optical disc 100 from a reproduced signal generated by the signal generating module 122. In addition, the information recording module 126 in the system control module 120 records data in a recordable area of the optical disc 100.

In addition, although not shown in drawings, the optical pickup 110 is mounted with elements to perform aberration correction or polarization as well.

The actuator 112 is driven by an actuator drive module 123 which has received a drive signal output by the system control module 120, and moves the objective lens 113 in almost focus direction and in almost radius direction of the optical disc 100.

The optical disc apparatus of the present Embodiment, after loading the optical disc 100, determines by BCA that the loaded optical disc 100 has the recording layers of two or more media types, and then in the case of moving the light spot to a recording layer composed of tracks, sets the push-pull signal as the tracking error signal; while in the case of moving the light spot to a recording layer for reproduction only composed of pits, sets a DPD signal as the tracking error signal.

Figure 10:
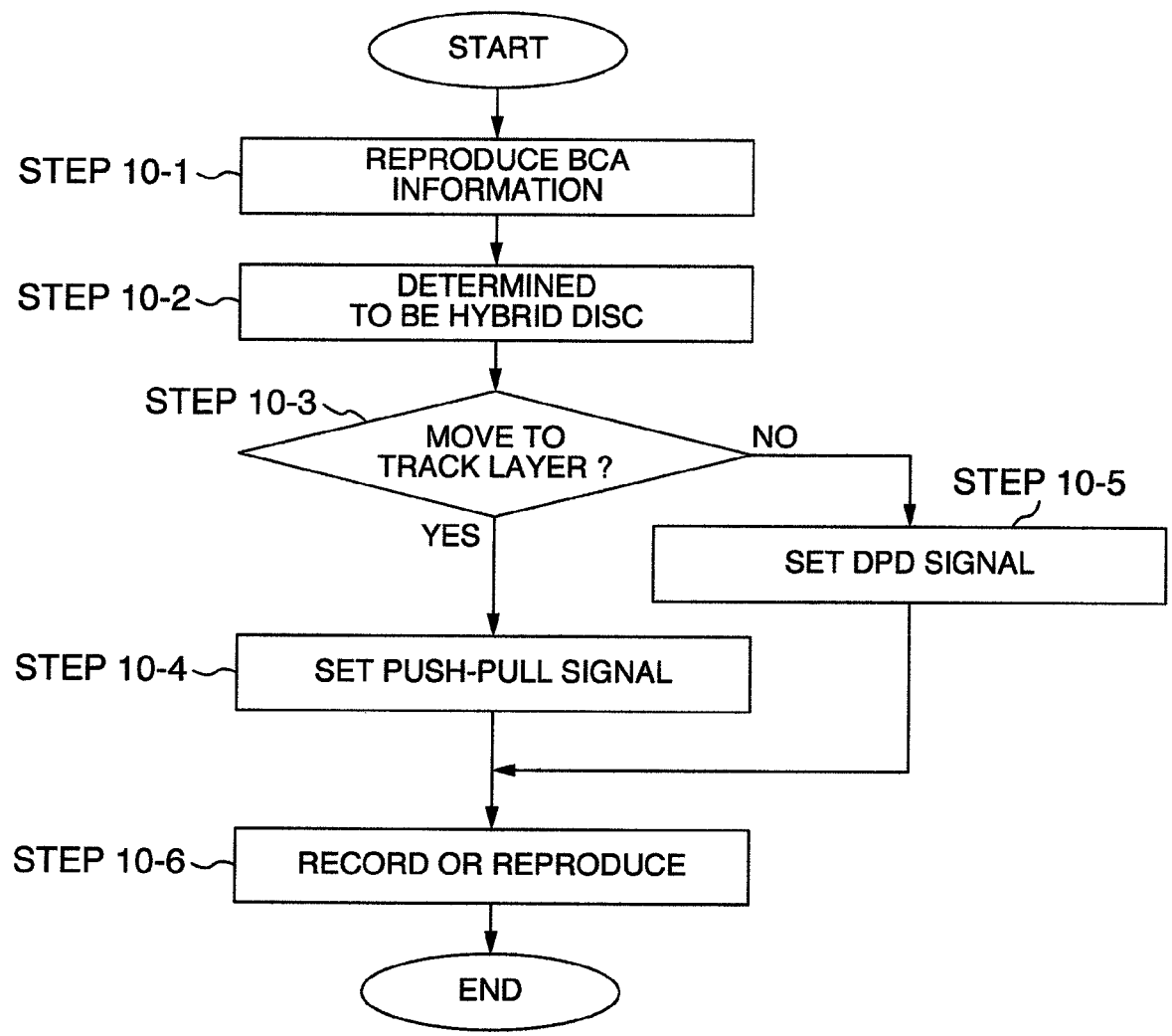
FIG. 10 is a flow chart showing an example of recording processing or reproducing processing (Embodiment 7).

Next, an example of recording processing or reproducing processing of the above optical disc apparatus will be explained using the flow chart of FIG. 10.

Firstly, BCA information described using any of the above Embodiments 1 or 6 is reproduced (step 10-1). It is recognized to be a hybrid disc (step 10-2). It is determined whether to move the light spot to the recording layer of tracks, or to recording layer of pits (step 10-3). In the case of moving it to the recording layer of tracks, the push-pull signal is generated as the tracking error signal (step 10-4). In the case of moving it to the recording layer of pits, the DPD signal is generated as the tracking error signal by the phase difference scheme (step 10-5).

Herewith, stable tracking servo can be performed in each recording layer.

After this, in an objective layer, information is reproduced or recorded (step 10-6).

It should be noted that the present Embodiment is not limited to set-up processing just after loading the optical disc 100, but is also applicable to arbitrary processing to be performed accompanying with reproducing processing or recording processing.

Figure 11:
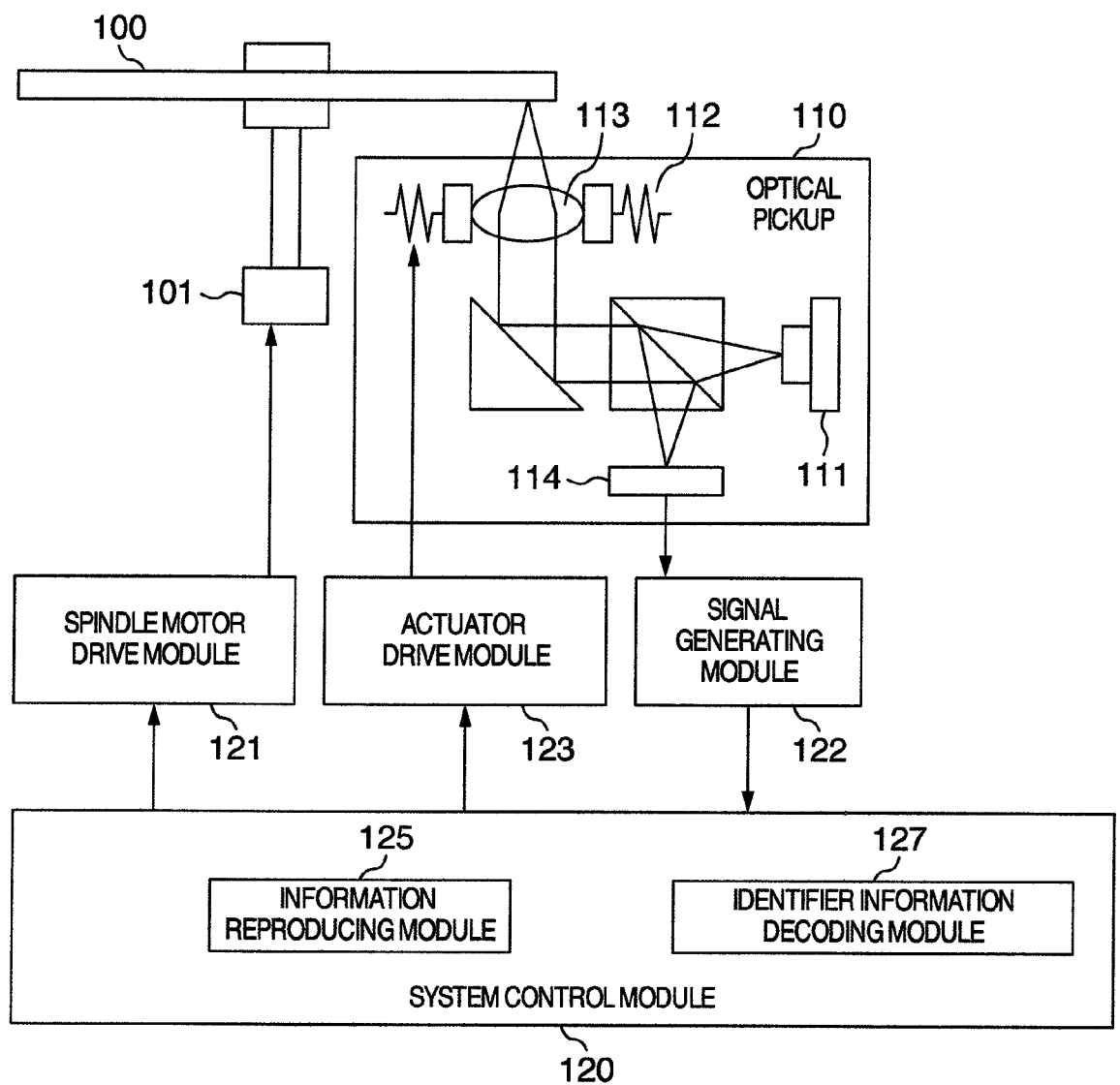
FIG. 11 is a block diagram showing a configuration example of an optical disc apparatus (Embodiment 8).

In addition, in the case of performing reproducing processing without performing recording processing, the processing of the present Embodiment is possible to perform also in the optical disc apparatus shown in the block diagram of FIG. 11.

Without limiting to the tracking error signal, the present Embodiment is also applicable to the determination performed in generating the focus error signal etc.

Embodiment 8

The optical disc apparatus may accompany with focus jump in reproducing or recording information. And, the optical disc apparatus of the present Embodiment performs focus jump, by acquiring the disc layer type identifier or the disc structure or the recording layer information described using any of the above Embodiments 1 to 6.

The optical disc apparatus of the present Embodiment has the same configuration as the block diagram shown in FIG. 9 used by Embodiment 7. It is assumed that the optical disc 100 has also recording layers of two or more media types, in the same way as in Embodiment 7. In addition, the optical disc 100 has information on the recording layer in DI of the PIC part, as described in Embodiments 1 to 6.

As for this optical disc 100, in performing the focus jump for moving the light spot between the layers, the focus jump is performed after moving the light spot to the PIC part or the vicinity thereof. It should be noted that "the focus jump" means, for example, the change of the recording layer to be recorded or reproduced from a certain layer to another layer, in the optical disc having a plurality of recording layers. In addition, the focus jump is performed, for example, by changing the focus position of the laser light by the optical pickup 110.

Figure 12:
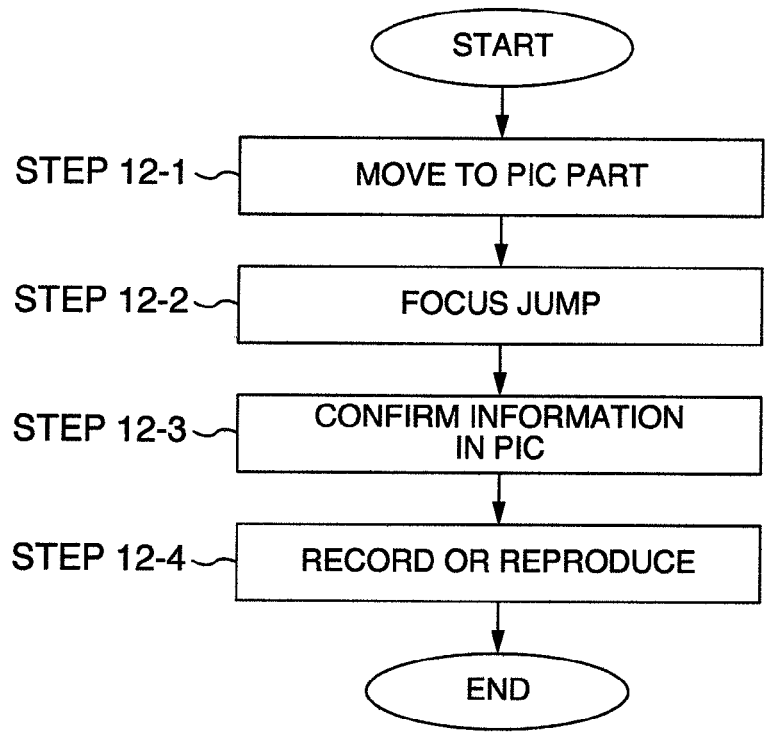
FIG. 12 is a flow chart showing an example of recording processing or reproducing processing (Embodiment 8).

Next, an example of recording processing or reproducing processing by the above optical disc apparatus will be explained using the flow chart of FIG. 12.

Firstly, the light spot is moved to the PIC part in the recording layer before the jump (step 12-1). The focus jump action is performed (step 12-2). PIC data in the layer to which the light spot is moved is reproduced and it is confirmed that the layer is an object recording layer (step 12-3).

After that, at the objective layer, information is reproduced or recorded (step 12-4).

It should be noted that DI is contained not only in PIC but also in a wobble, if the layer has tracks. Accordingly, the present optical disc apparatus may also be configured so as to generate DI from the wobble. However, DI generation from the wobble needs to reproduce more tracks than the DI generation from PIC. Accordingly, DI generation from the PI area is advantageous in view of suppressing increase in processing time. On the other hand, DI contained in the wobble is advantageous considering that DI can be acquired from other part even in the case of presence of defect in a part of the data area, because the wobble contains DI periodically. In addition, the optical disc apparatus may be configured so as to acquire DI from the wobble, where DI cannot be acquired from PIC, or from PIC and BCA. Herewith, it becomes possible to perform access more reliably. However, processing to acquire DI from the wobble should be performed where the objective layer is an RE layer.

In this way, the optical disc apparatus of the present Embodiment performs the above focus jump at the vicinity of a PIC (Permanent Information & Control Data) area, in the focus jump processing where the light spot moves between the recording layers.

In addition, it is desirable that the focus jump is performed so that the light spot can be moved to a radius position of the vicinity of the PIC part in the objective layer, because the radius position of PIC in the optical disc 100 is different depending on the recording layer.

Herewith, it can be judged easily after completion of the focus jump whether a recording layer to which the light spot is moved by the focus jump is an objective recording layer or not, and thus stable focus jump can be performed.

In addition, in the processing of the present Embodiment, it is possible to perform reproducing processing without performing recording processing also in the optical disc apparatus shown in the block diagram of FIG. 11.

Embodiment 9

The optical disc apparatus of the present Embodiment has the same configuration as that in the block diagram shown by FIG. 11. Elements in FIG. 11 of the same reference numbers as those in FIG. 9 are the same elements as those in the block diagram of FIG. 9.

The optical disc apparatus of the present Embodiment, after loading the optical disc 100, determines by BCA that the loaded optical disc 100 has the recording layers of two or more media types, reconfirms information thereof by DI in the PIC area. Information reproducing module 125 of the system control module 120 reproduces DI or information recorded in the optical disc 100.

Figure 13:
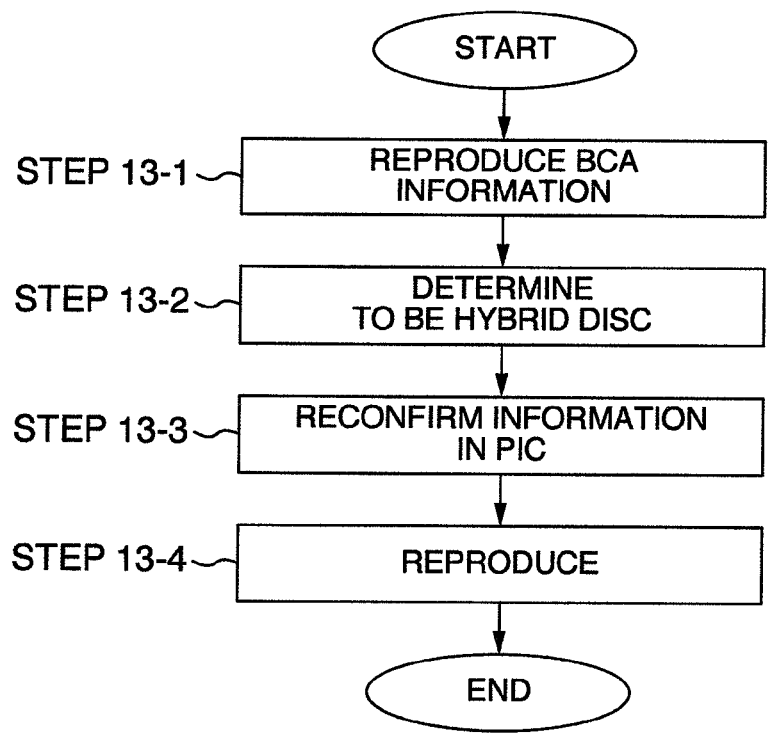
FIG. 13 is a flow chart showing an example of reproducing processing (Embodiment 9).

Next, an example of reproducing processing by the above optical disc apparatus will be explained using the flow chart of FIG. 13.

Firstly, BCA information is reproduced (step 13-1). It is determined from reproduced information that the disc is a hybrid disc (step 13-2). The light spot is moved to the PIC part and information of the optical disc 100 is reconfirmed (step 13-3).

After that, information is reproduced from the objective layer (step 13-4).

In this way, the optical disc apparatus of the present Embodiment, after reproducing BCA and making access to a predetermined recording layer, reproduces PIC and reacquires the disc layer type identifier or the disc structure. Herewith, it becomes possible to enhance the precision to determine whether the access is successful or not. It may also be configured to acquire DI from the wobble, instead of PIC.

In addition, even the optical disc apparatus shown in FIG. 9 can perform processing of the present Embodiment. In this case, information can be reproduced or recorded in step 13-4.

As described above using each Embodiment, the present optical disc recording apparatus is the one which records information on an optical disc, comprising:

an objective lens to focus laser light; an actuator to drive the above objective lens; a detector to detect reflected light from the optical disc; a signal generating module to generate a reproduced signal of information recorded on the optical disc, and an error signal for servo control, from the reflected light detected with the above detector; and a drive module to drive the actuator; wherein where the optical disc has one or more first type layers, and one or more second type layers different from the first type layers, and at least one of the first type layers records information indicating the first type and the second type, and information indicating the sum of the number of the first type layers and the number of the second type layers, by driving the objective lens so as to focus on one layer among the first type layers, the optical disc recording apparatus acquires from the one layer any of the information indicating the first type and the second type, and the information indicating the sum of the number of the first type layers and the number of the second type layers.

In addition, the recording method of the present Embodiment is the one which records information on an optical disc, wherein the optical disc has one or more first type layers, and one or more second type layers different from the first type layers, and at least one of the first type layers records information indicating the first type and the second type, and information indicating the sum of the number of the first type layers and the number of the second type layers, and the method comprises steps of:

focusing on one layer among the first type layers; and acquiring from the one layer, any of the information indicating the first type and the second type, and the information indicating the sum of the number of the first type layers and the number of the second type layers.

Embodiment 10

Using the present Embodiment, the optical device 100 having recording layers will be described, the arrangement order of which is BD-RE/BD-ROM/BD-ROM from the back of the disc to the surface thereof.

Figures 14, 15, 16:
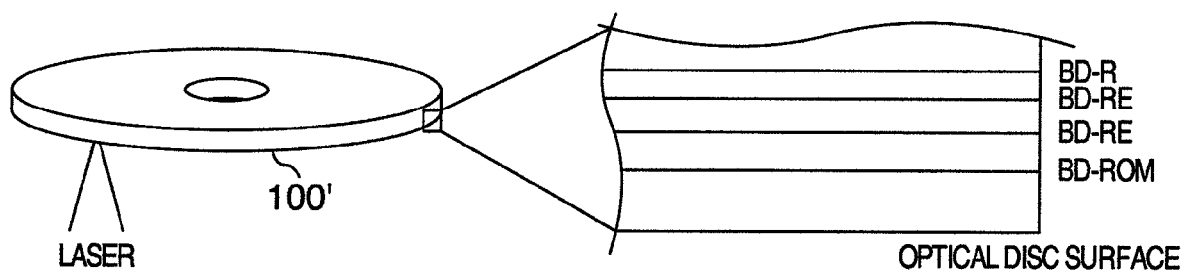
FIG. 14 shows an example of a disc layer type identifier and a disc structure (Embodiment 10).
FIG. 15 shows an example of a disc layer type identifier and a disc structure (Embodiment 11).
FIG. 16 shows an example of a recording layer of an optical disc (Embodiment 12).

FIG. 14 shows a disc layer type identifier and a disc structure of the present Embodiment.

It is assumed that the disc layer type identifier in PIC of BD-RE is "WO1". "W" represents BD-RE, "O" represents BD-ROM and "1" represents that the number of all recording layers of said medium BD-RE is one. According to this rule, it is assumed that the disc layer type identifier in PIC of BD-ROM is "WO2". On the other hand, it is assumed that the disc layer type identifier in BCA is "WO3". "3" represents the number of all layers of said optical disc 100. It should be noted that this "3" may be "T", etc. of TL (triple layers). Similarly, ASCII codes defined otherwise may be substituted for it, such as "S" for "1", "D" for "2".

That is, in the present optical disc 100, the disc layer type identifier of a certain recording layer records information indicating what is a media type of said layer, information indicating what are media types of other recording layers, and information indicating the number of recording layers of said medium.

In addition, the disc layer type identifier in BCA contains information indicating what are media types of recording layers which the optical disc 100 has, and information indicating the sum of numbers of recording layers of each media type.

The disc structure is also different in PIC and BCA. It is assumed that the disc structure is "TL/RE" in PIC of the recording layer of BD-RE, and "TL/ROM" in PIC of the recording layer of BD-ROM. On the other hand, it is assumed that the disc structure in BCA is "TL/RE+ROM". Information in PIC represents the number of all recording layers of said optical disc 100 and a media type of said medium, and information in BCA represents the number of all recording layers of said optical disc 100 and types of all media. Specifically, in BCA, TL (triple layers) represents that the total number of recording layers is three, and RE+ROM represents that there are both media of RE and ROM.

That is, in the present optical disc 100, the disc structure in PIC of a certain recording layer contains information indicating what is a media type of said layer, and information indicating how many recording layers said optical disc 100 has in total. In addition, in the present optical disc 100, the disc structure in BCA contains information indicating the number of all recording layers which the optical disc 100 has, and information indicating what are media types of recording layers which said optical disc 100 has.

In addition, the disc structure in BCA contains information indicating what are media types of recording layers which the optical disc 100 has, and information indicating the sum of numbers of the recording layers of each media type.

Herewith, the optical disc apparatus can know all configurations of the inserted optical disc 100, by reading BCA or PIC. In addition, even where either of BCA or PIC cannot be reproduced because of flaw or stain thereof, all configurations of said disc can be known if any of them can be read.

Here, in the optical disc 100 in FIG. 2, only the farthest recording layer from the disc surface records BCA, but where at least one BCA is recorded in the recording layer of each medium, DI in BCA may record the same information as PIC does.

Embodiment 11

Using Embodiment 10, the optical disc 100 having recording layers was explained, the arrangement order of which is BD-RE/BD-ROM/BD-ROM from the back of the disc to the surface thereof.

Using the present Embodiment, the optical disc 100 having recording layers will be explained, the arrangement order of which is BD-ROM/BD-RE/BD-RE from the back of the disc to the surface thereof.

FIG. 15 shows a disc layer type identifier and a disc structure of the present Embodiment.

In the present Embodiment, information in the disc layer type identifier on the optical disc 100 is different from that in Embodiment 10, as for the arrangement order of the recording layer of each media type in a layer thickness direction of the optical disc 100.

It is assumed that the disc layer type identifier is "OW1" in PIC of BD-ROM. "O" represents BD-ROM, "W" represents BD-RE, and "1" represents that the number of all recording layers of said medium BD-ROM is one. According to this rule, it is assumed that the disc layer type identifier is "OW2" in PIC of BD-RE. On the other hand, it is assumed that the disc layer type identifier is "OW3" in BCA. "3" represents the number of all layers of said optical disc 100. "W" represents BD-RE, "O" represents BD-ROM, and "3" represents that the number of all recording layers of said optical disc 100 is three, which are the same as those in Embodiment 10, however, the order of "W" and "O" is different from that in Embodiment 10.

In this way, by arranging the ASCII codes corresponding to each media type according to the arrangement order from the back of the disc to the surface thereof, characteristics of said optical disc 100 can be given in more detail. It should be noted that the farthest recording layer from the disk surface here means the recording layer positioned at the farthest from the optical pickup when the optical disc 100 is loaded into the optical disc apparatus.

In addition, in the above example, a configuration is shown that the more in the back with respect to the disc surface the recording layer of a certain media type is positioned, the higher rank byte in the disc layer type identifier is assigned to the byte indicating the media type. However, the present invention is not limited thereto, and the nearer to the disc surface the recording layer of a certain media type is positioned, the higher rank byte in the disc layer type identifier may also be configured to be assigned to the byte indicating the media type.

It should be noted that the disc structure is the same, for example, as that in Embodiment 10. It is assumed that the disc structure is "TL/RE" in PIC of the recording layer of BD-RE, and "TL/ROM" in PIC of the recording layer of BD-ROM. On the other hand, it is assumed that the disc structure in BCA is "TL/RE+ROM". Information in PIC represents the number of all recording layers of said optical disc 100 and said media type, and information in BCA represents the number of all recording layers of said optical disc 100 and types of all media.

Embodiment 12

The present Embodiment is an example where the disc layer type identifier and the disc structure different from Embodiments 10 and 11 are applied to the optical disc 100' shown in FIG. 16. In the optical disc 100' of FIG. 16, the arrangement order of recording layers is BD-R/BD-RE/BD-RE/BD-ROM from the back of the disc to the surface thereof.

FIG. 17 shows a disc layer type identifier and a disc structure of the present Embodiment.

The disc layer type identifier of the present Embodiment differs in PIC and BCA.

It is assumed that the disc layer type identifier is "RX1" in PIC of the recording layer of BD-R. In addition, it is assumed that the disc layer type identifier is "RX2" in PIC of the recording layer of BD-RE. In addition, it is assumed that the disc layer type identifier is "RX1" in PIC of the recording layer of BD-ROM. In addition, it is assumed that the disc layer type identifier is "RX4" in BCA. The disc layer type identifier in PIC represents arrangement of each medium and the number of recording layers of said medium. In more specifically, the first byte, which is the highest byte in the disc layer type identifier, represents a type of the farthest medium from the disc surface. In addition, the second byte of the disc layer type identifier represents arrangement of the other media. In addition, the disc layer type identifier in BCA represents arrangement of the media of said optical disc 100' and the number of all recording layers. In the above case, for example, in the disc layer type identifier of BD-R, "R" represents BD-R, "X" represents that the arrangement order of the media next to the BD-R medium is BD-RE/BD-ROM from the back surface of the disc to the disc surface thereof, and "1" represents the number of the recording layer of said medium BD-R. In the case of the disc layer type identifier in BCA, "R" represents that the BD-R medium is arranged farthest from the disc surface, "X" represents that the arrangement order of the media next to the BD-R medium is BD-RE/BD-ROM from the back of the disc to the surface thereof, and "4" represents that the number of all recording layers of said disc is four. This "4" may also be substituted with "Q", etc. representing QL (quad layers).

That is, the disc layer type identifier in PIC of said recording layer contains information indicating a type of the farthest medium from the disc surface in said optical disc 100' and arrangement of other types of media, and information indicating the number of recording layers of said medium.

In addition, the disc layer type identifier in BCA contains information indicating the media types of said optical disc 100' and arrangement thereof, as well as the number of all recording layers.

On the other hand, it is assumed that the disc structure is "QL/R" in PIC of the recording layer of BD-R, "QL/RE" in PIC of the recording layer of BD-RE, and "QL/ROM" in PIC of the recording layer of BD-ROM. On the other hand, it is assumed that the disc structure in BCA is "QL/R+RE+ROM". Information of PIC represents the number of all recording layers of said optical disc 100' and the type of said medium, and information in BCA represents the number of all recording layers of said optical disc 100' and the types of all media. Specifically, in BCA, QL represents that the total number of recording layers is four, and R+RE+ROM represents that there are three media R, RE and ROM.

That is, the disc structure contains information indicating the number of all recording layers, and information indicating a media type of each recording layer.

Here, as a method for indicating RE+ROM by the disk structure, for example it is considered that three bits in 1-byte information represent ROM, R and RE, respectively, and media corresponding to bits of "1" among them are used as the recording layer of said optical disc 100'.

In the present Embodiment, even three or more media can be dealt with by defining two media types and their arrangement using one byte in a code of the disc layer type identifier.

The present Embodiment is an example where "X" is defined as media of BD-RE and BD-ROM and their arrangement, which is the second byte assigned to the second and third media from the back of the optical disc 100'. In addition, for example, by changing the second byte of the disc layer type identifier in PIC of the recording layer of BD-R to "RY1", the second byte may be configured so as to indicate that the second and third media from the back of the disc are BD-ROM and BD-RE, respectively. Herewith, for example, even if the second and third media types of the optical disc 100' shown in FIG. 16 are changed as those of the optical disc 100" shown in FIG. 23, such case can be dealt with. In this case, the second and third media become BD-ROM and BD-RE, respectively, and the disc layer type identifiers in PIC of both media may be "RY2" and "RY1". In addition, the first and second media from the back of the disc may be defined by the first byte to be used like "XR1", and thus various patterns can be dealt with.

Embodiment 13

The disc layer type identifier and the disc structure of the present Embodiment correspond to the optical disc 100' shown in FIG. 16, and are different from those in Embodiment 12.

FIG. 18 shows a disc layer type identifier and a disc structure of the present Embodiment.

It is assumed that the disc layer type identifier is "RX4" both in BCA and in PIC. The first byte "R" represents that BD-R is arranged farthest from the disc surface, and "X" represents that the arrangement order of the media next to the BD-R medium is BD-RE/BD-ROM from the back of the disc to the surface thereof, and "4" represents that the number of all recording layers of said disc 100' is four. This "4" may also be substituted with "Q", etc. of QL.

That is, the disc layer type identifier contains information indicating all media types of said optical disc 100' and arrangement order thereof, and information indicating the total number of all recording layers. In addition, the disc layer type identifier contains an ASCII code with one byte corresponding to a combination of a plurality of media types.

On the other hand, the disc structure is different in PIC and BCA. Among them, it is assumed that the disc structure is "SL/R" in PIC of the recording layer of BD-R, "DL-RE" in PIC of the recording layer of BD-RE, and "SL/ROM" in PIC of the recording layer of BD-ROM. On the other hand, it is assumed that the disc structure in BCA is "QL/R+RE+ROM". Information in PIC represents the number of recording layers of each medium and a media type thereof, and information in BCA represents the number of all recording layers and types of all media. Specifically, in BCA, QL represents that the total number of recording layers is four, and R+RE+ROM represents that there are three media R, RE and ROM.

That is, in the present optical disc 100', the disc structure in PIC of a certain recording layer records information indicating what is a media type of said layer, and information indicating how many recording layers of the same media type there are.

In addition, in the optical disc 100', the disc structure in BCA contains information indicating the sum of all recording layers which the optical disc 100' has, and information indicating what are media types of recording layers which said optical disc 100' has.

Herewith, the optical disc apparatus can know all configurations of the inserted optical disc 100', by reading BCA or PIC. In addition, even where either of BCA or PIC cannot be reproduced due to flaw or stain thereof, all configurations of said disc can be known if any of them can be read.

It should be noted that in the above example, the second byte "X" of the above disc layer type identifier is defined as the second and third media which are BD-RE and BD-ROM, respectively. However, the present invention is not limited thereto, and includes various cases, for example, the second byte "Y" is defined as the second and third media which are BD-ROM and BD-RE, respectively.

In addition, in the present Embodiment, "X" defines BD-RE and BD-ROM as the second and third media from the back of the optical disc 100', respectively. However, the present invention is not limited thereto, and it may be define as the first and second media from the back of the disc to be used like "XR1".

Further, it was explained in the above example that the second byte "X" of the above disc layer type identifier is information corresponding to a combination of BD-RE and BD-ROM. However, the disc layer type identifier is not limited to this example, and a one-byte ASCII code may indicate a combination of a plurality of media types and the arrangement order thereof. For example, a character "X" may indicate that the optical disc 100' has the arrangement order BD-ROM/BD-RE from the back to the surface. For example, a character "Z" may also indicate that the optical disc 100' has the arrangement order BD-RE/BD-ROM from the back to the surface. In this way, it is possible to increase further amount of information detectable from the disc layer type identifier.

In addition, in the above example, more in the back with respect to the disc surface a certain recording layer is positioned, the higher rank byte is assigned to a character or information representing the media type. However, the present optical disc is not limited thereto, and more in the back with respect to the disc surface a certain recording layer is positioned, the lower rank byte may be assigned to a character or information representing the media type.

In addition, an ASCII code indicating the combination may not only indicate a combination of two media types, but also define a combination of three or more media types. In addition, the combination may be represented using two codes defining a combination like "XY2". Herewith, much more media types which the optical disc 100' has and their arrangement can be represented.

In the present Embodiment different from Embodiment 12, disc information in PIC are divided into two roles: the disc layer type identifier which has general information on said optical disc 100'; and the disc structure which has information on said medium.

Embodiment 14

The present Embodiment is an example of a disc layer type identifier and a disc structure corresponding to the optical disc 100' shown in FIG. 16.

FIG. 19 shows the disc layer type identifier and the disc structure of the present Embodiment.

The disc layer type identifier differs in PIC and BCA, and it is assumed that the disc layer type identifier is "K1Q" in PIC of the recording layer of BD-R, "K2Q" in PIC of the recording layer of BD-RE, and "K3Q" in PIC of the recording layer of BD-ROM, and that the disc layer type identifier in BCA is "BKQ". Here, the first byte "K" in the disc layer type identifier in PIC is the highest rank byte, and represents that the arrangement order of the media is BD-R/BD-RE/BD-ROM from the back of the optical disc 100' to the surface thereof. In addition, for example, in the case of BD-R, the second byte "1" represents the farthest medium from the disc surface, and "Q" represents the number of all recording layers of said optical disc 100'.

In this way, in the present Embodiment, a one-byte ASCII code in the disc layer type identifier in each recording layer indicates a combination of the media types which the optical disc 100' has and the arrangement order thereof. In addition, a one-byte ASCII code indicates where the media type is in the above arrangement order.

Also in the disc layer type identifier in BCA, the second byte "K" represents the meaning similar to that in PIC, and also "Q" represents the meaning similar to that in PIC. In PIC, a configuration of said optical disc 100' can be read from the first code, and type of said medium and the number of all recording layers can be read from the definition thereof.

In addition, unlike the present Embodiment, a one-byte ASCII code contained in the disc layer type identifier may indicate a combination of the media types, the arrangement order thereof, and arrangement order of the media type in the above arrangement order. For example, "L" indicates that the optical disc 100' has the arrangement order BD-R/BD-RE/BD-ROM from the back of the disc to the surface thereof, and further "L" may indicate that the recording layer recording "L" is the first recording layer (a BD-R layer) in the above order. In addition, for example, "M" indicates that the optical disc 100' has the arrangement order BD-R/BD-RE/BD-ROM from the back of the disc to the surface thereof. Further "M" indicates that the recording layer recording "M" is the second recording layer (a BD-RE layer) in the above order. Such a configuration makes it possible to record more information in the disc layer type identifier.

The disc structure is the same as that in Embodiment 13.

The arrangement order of the three ASCII codes of the disc layer type identifier may be changed.

The method of the present Embodiment enables the disc layer type identifier to have more information.

Embodiment 15

The present Embodiment is an example of a disc layer type identifier and a disc structure corresponding to the optical disc 100' shown in FIG. 16.

FIG. 20 shows the disc layer type identifier and the disc structure of the present Embodiment.

It is assumed that the disc layer type identifier differs in PIC and BCA and is "K1S" in PIC of the recording layer of BD-R, "K2D" in PIC of the recording layer of BD-RE, and "K3S" in PIC of the recording layer of BD-ROM, and that the disc structure in BCA is "BKQ". The first byte "K" in PIC is the highest rank byte, and represents that the arrangement order of the media is BD-R/BD-RE/BD-ROM from the back of the optical disc 100' to the surface thereof. In addition, the second byte "1" in the information identifier of BD-R represents that said medium is arranged farthest from the disc surface, and "S" represents the number of recording layers of said medium. In the disc layer type identifier in BCA, the first byte "K" represents the meaning similar to that in PIC, and "Q" represents the number of all recording layers of said optical disc 100'. The first code of the disc layer type identifier in PIC indicates a media configuration of said optical disc 100', and a type of said medium can be read from definition thereof, and further indicates the number of recording layers thereof.

It is assumed that the disc structure is "QL/R+RE+ROM" both in PIC and in BCA, and "QL" represents that four is the number of all recording layers of said optical disc 100', and "R+RE+ROM" represents all types of media which said optical disc 100' has.

Embodiment 16

The present Embodiment is an example of a disc layer type identifier and a disc structure corresponding to the optical disc 100' shown in FIG. 16.

Figures 24, 25:
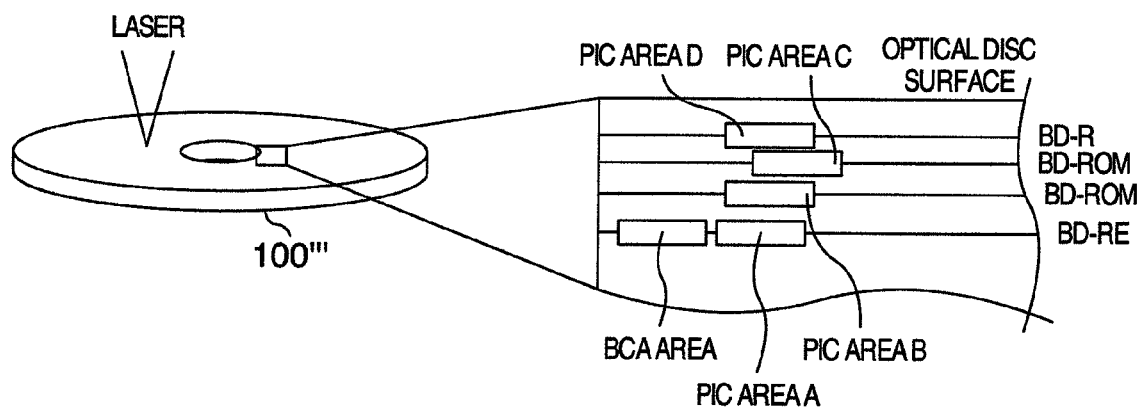
FIG. 24 shows an example of a disc layer type identifier and a disc structure (Embodiment 16).
FIG. 25 shows an example of a recording layer of an optical disc (Embodiment 16).

FIG. 24 shows the disc layer type identifier and the disc structure of the present Embodiment.

It is assumed that the disc layer type identifier is "BRS" in PIC of the recording layer of BD-R. "R" represents BD-R, and "S" represents that the recording layer of said medium is one layer. Similarly, it is assumed that the disc layer type identifier is "BWD" in PIC of the recording layer of BD-RE, and that the disc layer type identifier is "BOS" in PIC of the recording layer of BD-ROM.

It is assumed that the disc layer type identifier in BCA is "BDH", representing that said optical disc 100' is a hybrid disc.

That is, information in PIC represents a type of each medium and the number of the recording layer thereof, and information in BCA represents that said optical disc 100' is a hybrid disc. In the above case, "W" represents BD-RE, "O" represents BD-ROM, and "H" represents a hybrid disc. Codes such as "S" and "D" represent that the number of the recording layer of said medium is one layer or two layers, but the codes may be substituted with "1" and "2" representing the numbers themselves, respectively. In addition, it is assumed that "B" is B of BD, but it is not especially limited thereto.

That is, in PIC, the disc layer type identifier of a certain recording layer records information indicating a media type of said recording layer, and information indicating the number of the layer thereof.

In addition, the disc layer type identifier in BCA contains information indicating a hybrid disc containing the recording layers of a plurality of media types.

On the other hand, it is assumed that the disc structure is "QL/R+RE+ROM" both in BCA and in PIC. "QL" represents that the number of all recording layers of said optical disc 100' is four, and "R+RE+ROM" represents that the recording layer of said optical disc 100' is a combination of BD-R, BD-RE and BD-ROM.

That is, the disc structure contains information indicating the number of all recording layers, and information indicating media types which said optical disc 100' has.

Here, as a method for representing R+RE+ROM by the disk structure, it is considered a method that three bits in 1-byte information represent ROM, R and RE, respectively, and media corresponding to bits of "1" among them are used as the recording layers of said optical disc 100'.

It is explained using above Embodiments 1 to 7 that the disc layer type identifier and the disc structure corresponding to a recording layer of a certain media type are recorded in the recording layer of said certain media type. However, the optical disc of the present Embodiment is not limited thereto. For example, as for the present optical disc, the disc layer type identifier and the disc structure corresponding to the recording layer of the certain media type may be recorded in a recording layer of another media type. For example, the disc layer type identifier and the disc structure corresponding to layer configuration of the BD-R may be recorded in PIC or the wobble of the BD-RE layer. In addition, the optical disc may be configured so that after making one set of disc information corresponding to one recording layer, a plurality of sets of disc information are recorded in a predetermined recording layer.

Explanation will be given specifically, using the optical disc 100''' of FIG. 25. The BCA area contains disc information in BCA, the PIC area A contains disc information of BD-RE, the PIC area B and the PIC area C contain disc information of BD-ROM, and the PIC area D contains disc information of BD-R. Here, if the PIC area A also contains disc information of BD-ROM and BD-R, the PIC area A records information on the types and the number of all recording layers of said optical disc 100''', and thus the optical disc apparatus can read the types of all recording layers and the number of all recording layers of said optical disc 100''', by only reading information in the PIC area A.

A plurality of disc information recorded in the PIC area A may be added to other areas. Disk information recorded in BCA may also be added to PIC area A.

If the optical disc is configured in this way, the optical disc apparatus can acquire a plurality of sets of disc information from a predetermined layer. Further, the optical disc apparatus can read the configuration of all recording layer of said optical disc from the plurality of sets of disc information. Specifically, the optical disc apparatus can read the types of all recording layers and the number of all recording layers of the optical disc.

Embodiment 17

Structures of the optical disc 100, 100', 100'' and 100''' are explained in the above Embodiments. In the present Embodiment, the optical disc apparatus recording and reproducing on/from the above optical discs 100, 100', 100'' and 100''' will be explained. Even where either recording or reproducing information, the optical disc apparatus is necessary to access to a predetermined recording layer. And, the optical disc apparatus of the present Embodiment accesses the optical disc 100, by acquiring the disc layer type identifier, the disc structure, or recording layer information described in any of the above Embodiments 1 to 7. In addition, the optical disc apparatus of the present Embodiment acquires the disc layer type identifier or the disc structure in set-up processing when loading the optical disc 100. Here the set-up processing means a variety of adjustment processing to make it possible to reproducing or recording user data on/from the optical disc 100. In addition, the set-up processing may be rephrased as disc load processing, or loading processing. As an example, the optical disc 100 will be explained below, but it is naturally similar to the optical discs 100', 100" and 100'''.

Figure 21:
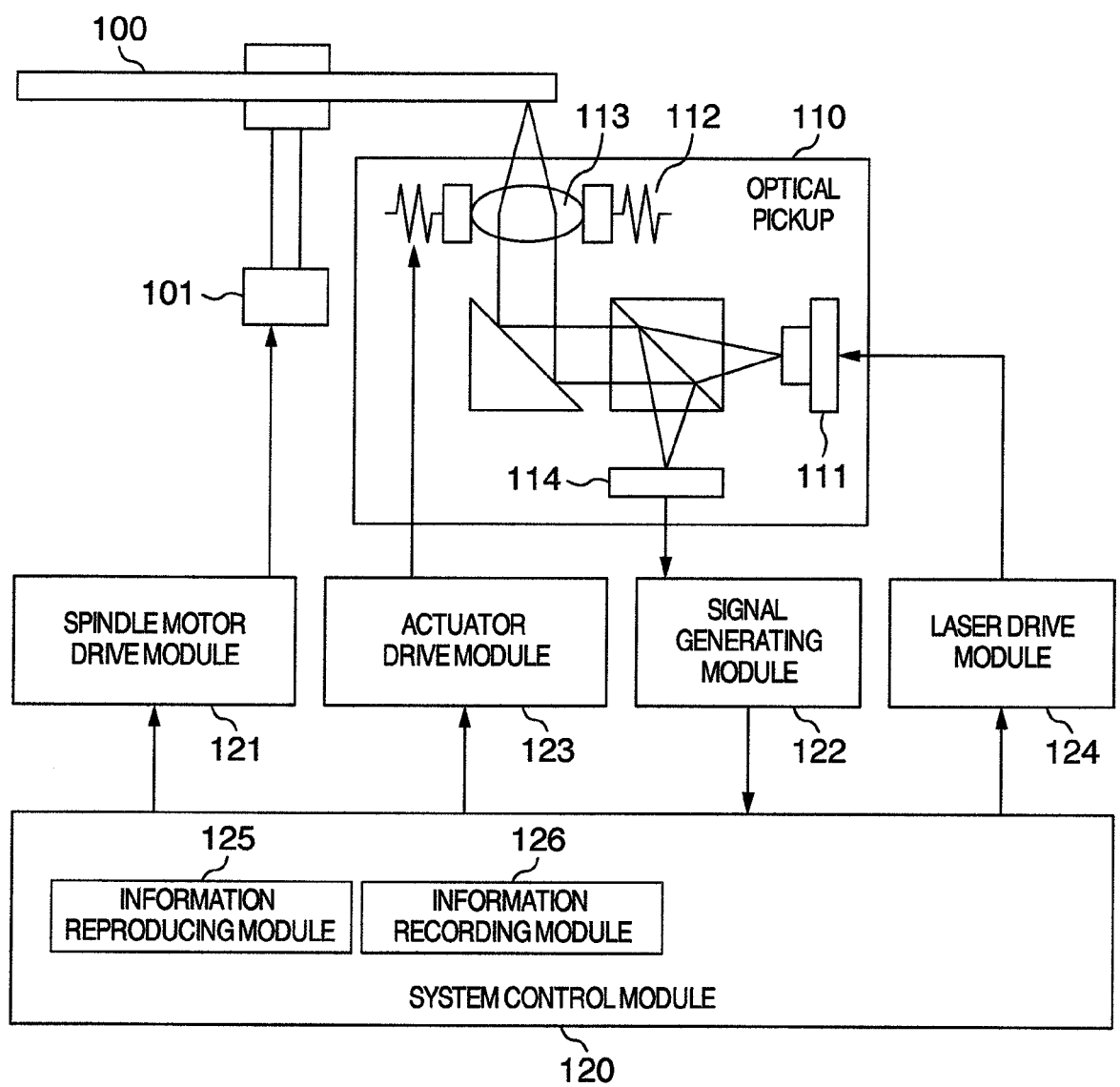
FIG. 21 is a block diagram showing a configuration example of an optical disc apparatus (Embodiment 17).

FIG. 21 is a block diagram showing a configuration of the optical disc apparatus of the present Embodiment.

The optical disc 100 has two or more media types, and information is read, erased and written by irradiating laser light from an optical pickup 110, as well as it is rotated by a spindle motor 101 driven by a spindle motor drive module 121 receiving a spindle motor drive signal from a system control module 120.

Laser light emitted from the semiconductor laser 111 is focused as a light spot on an information recording surface of the optical disc 100, by the objective lens 113 moved by the actuator 112, and reflected on the information recording surface of the optical disc 100, and detected by the light detector 114.

The signal generating module 122 generates the reproduced signal of information recorded in the optical disc 100, or the error signal for servo control from a signal detected by the light detector 114.

An information reproducing module 125 in the system control module 120 reproduces information of the optical disc 100 from a reproduced signal generated by the signal generating module 122. In addition, the information recording module 126 in the system control module 120 records data in a recordable area of the optical disc 100.

In addition, although not shown in drawings, the optical pickup 110 is mounted with elements to perform aberration correction or polarization and like.

When the actuator 112 receives a drive signal output from the system control module 120, it is driven by the actuator drive module 123, and moves the objective lens 113 in almost focus direction and in almost radius direction of the optical disc 100.

In addition, when the laser drive module 124 receives a signal from the system control module 120, it sets laser power of the semiconductor laser 111.

The optical disc apparatus of the present Embodiment, after loading the optical disc 100, determines by BCA that the loaded optical disc 100 has the recording layers of two or more media types, and then adjust and set laser power corresponding to the media type having the lowest optimal laser power among media types which the optical disc 100 have.

An example of laser power set processing by the above optical disc apparatus will be explained using the flow chart of FIG. 22. Firstly, information in BCA described using any of the above Embodiments 1 to 7 is acquired (step 11-1). A hybrid disc is determined and all media types which the optical disc 100 has are read (step 11-2); laser power is adjusted and set to a medium having the lowest optimal laser power (step 11-3).

If the lowest laser power is not known only by reading disc information in BCA, it is set after reading disc information in PIC.

In a state capable of recording or reproducing after completion of adjustment, the optical disc apparatus records or reproduces information in response to a command from a host (step 11-4).

Herewith, it is possible to reduce risk of losing or rewriting recorded data in all recording layers.

It should be noted that the present invention should not be limited to the above Embodiments, and various modifications are included. For example, the above Embodiments have been described in detail to explain the present invention in an understandable way, and thus the present invention should not be limited necessarily to that provided with all of the configurations explained. In addition, a part of the configuration of a certain Embodiment may be substituted with a configuration of another Embodiment. In addition, it is possible to add to a configuration of a certain Embodiment a configuration of another Embodiment. Further, addition, deletion and substitution are possible as for a part of the configuration of each Embodiment.

In addition, using the above Embodiments, it has been explained that one optical disc has a plurality of media types, but by applying the present invention also to the optical disc of one and the same media type, its information amount increases and it becomes usable.

In addition, a part of or all of the above each configuration may be either configured by a hardware, or configured so as to be achieved by performing a processor or a program. In addition, as for control lines or information lines, only those necessary for explanation are described, and thus all of the control lines or information lines necessary for a commercial product are not necessarily described. It may be considered that practically nearly all configurations are connected mutually.

This invention may also be practiced or embodied in the following ways.

(1) An optical disc 100 having one or more first type layers, and one or more second type layers different from the first type layers, wherein at least one of the first type layers records information indicating the first type, information indicating the number of the first type layers, and information indicating the sum of the number of the first type layers and the number of the second type layers.

(2) The optical disc 100 described in the above (1), wherein the first type layers are the ones for reproduction only, and the second type layers are the ones writable once or rewritable.

(3) The optical disc 100 described in the above (1), wherein the information indicating the first type, and the information indicating the number of the first type layers are recorded as disc layer type identifier information.

(4) The optical disc 100 described in the above (1), wherein information indicating the sum of the number of the first type layers and the number of the second type layers is recorded as disc structure information.

(5) The optical disc 100 described in the above (1), wherein the first type layer records information indicating that said optical disc 100 has the first type layers and the second type layers.

(6) The optical disc 100 described in the above (1), wherein the optical disc 100 comprises a management information area to record information indicating the sum of the number of the first type layers and the number of the second type layers, and information indicating that said optical disc 100 has the first type layers and the second type layers.

(7) The optical disc 100 described in the above (6), wherein the management information area is contained in BCA in the optical disc 100.

(8) The optical disc 100 described in the above (1), wherein the first type layer records information indicating arrangement order in the optical disc 100 of the first type layers and the second type layers.

(9) The optical disc 100 described in the above (8), wherein the first type layer records the information indicating the arrangement order as disc layer type identifier information.

(10) The optical disc described in the above (1), wherein the optical disc 100 comprises a management information area to record an information indicating that the optical disc 100 has two or more types of layers and information indicating the sum of numbers of said two or more types of layers, and said management information area is contained in BCA in the optical disc 100.

(11) The optical disc 100 described in the above (1), wherein
the disc layer type identifier information in the first type layer contains information indicating that said layer is the first type layer, and information indicating the number of the first type layers.

(12) The optical disc 100 described in the above (1), wherein
the disc layer type identifier information in the first type layer contains information indicating that said layer is the first type layer, and information indicating the number of the first type layers, and
the arrangement order of the first type layers in the optical disc 100 is indicated by a position in the disc layer type identifier information where information indicating that said layer is the first type layer is recorded.

(13) A reproducing method to reproduce information from an optical disc 100, wherein
the optical disc 100 has one or more first type layers, and one or more second type layers different from the first type layers, at least one of the first type layers recording information indicating the first type, information indicating the number of the first type layers, and information indicating the sum of the number of the first type layers and the number of the second type layers, and
the method comprises steps of:
focusing on one layer among the first type layers; and
acquiring from the one layer any of the information indicating the first type, the information indicating the number of the first type layers, and the information indicating the sum of the number of the first type layers and the number of the second type layers.

(14) An optical disc reproducing apparatus to reproduce information from an optical disc 100 comprising:
an objective lens 113 to focus laser light;
an actuator 112 to drive the objective lens 113;
a detector 114 to detect reflected light from the optical disc 100;
a signal generating module 122 to generate a reproduced signal of information recorded on the optical disc 100, and an error signal for servo control from reflected light detected with the detector 114; and
an actuator drive module 123 to drive the actuator 112; wherein,
where the optical disc 100 has one or more first type layers, and one or more second type layers different from the first type layers, and at least one of the first type layer records information indicating the first type, information indicating the number of the first type layers, and information indicating the sum of the number of the first type layers and the number of the second type layers,
one layer among the first type layers is focused on by driving the objective lens 113 to acquire from the one layer any of the information indicating the first type, the information indicating the number of the first type layers, and the information indicating the sum of the number of the first type layers and the number of the second type layers.

(15) An optical disc 100 having recording layers of a plurality of recording media and comprising:
a data area; and
a management information area to record disc layer type identifier information and disc structure information by which an apparatus to record or reproduce data can specify characteristics of the recording media, wherein
the disc layer type identifier information and the disc structure information contain: media types of the recording layers which the optical disc 100 has; and information relating to the number of all recording layers which the optical disc 100 has, and the number of recording layers of each media type.

(16) The optical disc 100 described in the above (15), wherein
the disc layer type identifier information contains information on all media types and the number of all recording layers which the optical disc 100 has.

(17) The optical disc 100 described in the above (15), wherein
the disc structure information in the management information area of each medium in the optical disc 100 contains information on the media type and the number of recording layers of each media type.

(18) The optical disc 100 described in the above (15), wherein
the disc structure information in BCA in the optical disc 100 contains information on all media types and the number of all recording layers which the optical disc 100 has.

(19) The optical disc 100 described in the above (15), wherein
the disc layer type identifier information contains information on all media types in the optical disc 100, arrangement order of the media, and the number of all recording layers.

(20) The optical disc 100 described in the above (15), wherein
the disc layer type identifier information in the management information area of each medium in the optical disc 100 contains information on the media type and the number of recording layers of the medium.

(21) The optical disc 100 described in the above (15), wherein
the disc layer type identifier information in BCA in the optical disc 100 contains information that the optical disc 100 has a plurality of media types, and on the number of all recording layers.

(22) The optical disc 100 described in the above (15), wherein
the disc structure information contains information on all media types and the number of all recording layers which the optical disc 100 has.

(23) The optical disc 100 described in the above (15), wherein
the disc layer type identifier information in the management information area of each medium in the optical disc 100 contains information on the media type, arrangement order of the medium, and the number of recording layers of the medium.

(24) An optical disc apparatus to reproduce information from an optical disc 100, or to record information on the optical disc 100 using laser light, comprising:
an objective lens 113 to focus laser light;
an actuator 112 to drive the objective lens 113;
a detector 114 to detect reflected light from the optical disc 100;
a signal generating module 122 to generate a reproduced signal of information recorded on the optical disc 100, and an error signal for servo control, from reflected light detected with the detector 114;
a control module to generate and output a drive signal to control the actuator 112; and
an actuator drive module 123 to amplify the drive signal and supply power to the actuator 112;
wherein
where the optical disc 100 has recording layers of a plurality of recording media, information in a management information area contained in an area cut with laser is read, after the optical disc 100 is loaded, and then a generating scheme of a tracking error signal is changed depending on the recording layer to which the light spot moves

(25) An optical disc 100 having recording layers of a plurality of media types and comprising:
　　a data area; and
　　management information areas to record disc layer type identifier information and disc structure information indicating characteristics of recording media; wherein
　　the disc layer type identifier information and the disc structure information contain information indicating the media types of the recording layers which the optical disc 100 has, information indicating the number of all recording layers which the optical disc 100 has, and information indicating the number of recording layers of each media type.

(26) The optical disc 100 described in the above (25), wherein
　　the optical disc 100 comprises management information areas corresponding to media types, respectively, and
　　the disc layer type identifier information in a management information area corresponding to a certain media type contains all media types in the optical disc 100 and information indicating the number of recording layers of said media type.

(27) The optical disc 100 described in the above (25), wherein
　　the disc layer type identifier information is composed of three ASCII codes.

(28) The optical disc 100 described in the above (27), wherein
　　two among the three ASCII codes indicate media types which the optical disc 100 has, and the other one indicates the number of all recording layers.

(29) The optical disc 100 described in the above (27), wherein
　　at least one among the three ASCII codes indicates a combination of two or more media types.

(30) The optical disc 100 described in the above (27), wherein
　　the optical disc 100 comprises management information areas corresponding to media types, respectively, and
　　in a management information area corresponding to a certain media type, one among the three ASCII codes indicates the number of recording layers of the certain media type, and the other two indicate the media types which the optical disc 100 has.

(31) The optical disc 100 described in the above (27), wherein
　　the optical disc 100 comprises management information areas corresponding to media types, respectively, and
　　in a management information area corresponding to a certain media type, one among the three ASCII codes indicates information on all media types which the optical disc 100 has, and arrangement relation of the media, and the other one indicates arrangement in the optical disc 100 of the recording layers of the certain media type.

(32) An optical disc 100 having recording layers of a plurality of media types and comprising:
　　a data area; and
　　management information areas to record disc layer type identifier information and disc structure information indicating characteristics of recording media;
　　wherein
　　the disc layer type identifier information and the disc structure information contain information indicating media types of the recording layers which the optical disc 100 has, information indicating the number of all recording layers which the optical disc 100 has, information indicating the number of recording layers of each media type, and information indicating arrangement relation of the media.

(33) The optical disc 100 described in the above (32), wherein
　　the optical disc 100 comprises management information areas corresponding to media types, respectively, and
　　the disc layer type identifier information in a management information area corresponding to a certain media type contains information indicating the number of recording layers of said certain media types, information indicating arrangement in the optical disc 100 of the recording layers of the certain media type, and information indicating all media types which the optical disc has 100.

(34) The optical disc 100 described in the above (32), wherein
　　the disc layer type identifier information is composed of three ASCII codes.

(35) The optical disc 100 described in the above (34), wherein
　　the optical disc 100 comprises management information areas corresponding to media types, respectively, and
　　in a management information area corresponding to a certain media type, two among the three ASCII codes indicate media types which the optical disc 100 has, and the other one indicates the number of all recording layers.

(36) The optical disc 100 described in the above (34), wherein
　　the optical disc 100 comprises management information areas corresponding to media types, respectively, and
　　in a management information area corresponding to a certain media type, one among the three ASCII codes indicates a combination of two or more media types.

(37) The optical disc 100 described in the above (34), wherein
　　the optical disc 100 comprises management information areas corresponding to media types, respectively, and
　　in a management information area corresponding to a certain media type, two among the three ASCII codes indicate media types which the optical disc 100 has, and the other one indicates the number of recording layers of the certain media type.

(38) The optical disc 100 described in the above (34), wherein
　　the optical disc 100 comprises management information areas corresponding to media types, respectively, and
　　in a management information area corresponding to a certain media type, one among the three ASCII codes indicates information on all media types and arrangement relation of the media which the optical disc 100 has, and the other one indicates arrangement in the optical disc 100 of the recording layers of the certain media type.

(39) The optical disc 100 described in the above (34), wherein
　　the optical disc 100 comprises management information areas corresponding to media types, respectively, and
　　in a management information area corresponding to a certain media type, one among the three ASCII codes indicates information on the number of recording layers of the certain medium type, and at least one among the other two indicates information on media types which the optical disc 100 has.

(40) An optical disc apparatus to reproduce information from an optical disc 100 or to record information on the optical disc 100 using laser light, comprising:
　　a light emitting module 111 to emit laser light;
　　an objective lens 113 to focus the laser light;
　　an actuator 112 to drive the objective lens 113;
　　a detector 114 to detect the reflected light from the optical disc 100;
　　wherein
　　where the optical disc 100 has recording layers of a plurality of media types, in loading processing after loading the optical disc 100, after reading disc information of the optical disc 100, the loading processing is continued with laser power corresponding to a media type among the plurality of media types which has the lowest optimal laser power.

(41) A reproducing method to reproduce information from an optical disc 100 having recording layers of a plurality of media types using laser light, comprising steps of:
　　acquiring information indicating media types of recording layers which the optical disc 100 has, information indicating the number of all recording layers which the optical disc 100 has, and information indicating the number of recording layers of each media type, from disc layer type identifier information or disc structure information recorded on the optical disc 100; and reproducing information.

(42) A recording method to record information on an optical disc 100 having recording layers of a plurality of media types using laser light, comprising steps of:

acquiring information indicating media types of the recording layers which the optical disc 100 has, information indicating the number of all recording layers which the optical disc 100 has, and information indicating the number of recording layers of each media type, from disc layer type identifier information or disc structure information recorded on the optical disc 100; and recording information.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

The invention claimed is:

1. An optical disc having one or more first type layers, and one or more second type layers different from the first type layers, wherein:
    a management information area is present on each recording layer of the optical disk,
    each management information area is configured to record information indicating whether the layer type of each recording layer of the optical disc is the first type layer or the second type layer, and
    each management information area is configured to record information indicating the sum of the number of the first type layers and the number of the second type layers.

2. The optical disc according to claim 1, wherein
    the management information area on each recording layer of the optical disc is configured to record information indicating the number of the first type layers and the number of the second type layers.

3. The optical disc according to claim 1, wherein
    information indicating the sum of the number of the first type layers and the number of the second type layers is configured to be recorded on the management information area as disc structure information.

4. The optical disc according to claim 1, wherein
    the management information area is configured to record information indicating arrangement order in the optical disc of the first type layers and the second type layers.

5. The optical disc according to claim 4, wherein
    the management information area is configured to record the information indicating the arrangement order as disc layer type identifier information.

6. A reproducing method to reproduce information from an optical disc, the method comprising:
    focusing on one layer among a first type layers, wherein:
        the optical disc has one or more first type layers, and one or more second type layers different from the first type layers, a management information area is present on each recording layer of the optical disc,
        each management information area is configured to record information indicating whether the layer type of each recording layer of the optical disc is the first type layer or the second type layer, and
        each management information area is configured to record information indicating the sum of the number of the first type layers and the number of the second type layers; and
    acquiring from the management information area on the one layer the information indicating whether the layer type of each recording layer of the optical disc is the first type layer or the second type layer, and the information indicating the sum of the number of the first type layers and the number of the second type layers.

7. The reproducing method according to claim 6, wherein
    the optical disc records information indicating the number of the first type layers and the number of the second type layers, and
    the method comprises steps of:
    acquiring from the management information area on the one layer any of the information indicating the first type and the second type, the information indicating the number of the first type layers and the number of the second type layers, and the information indicating the sum of the number of the first type layers and the number of the second type layers.

8. A recording method to record information on an optical disc having recording layers of a plurality of media types using laser light, wherein
    the method comprises steps of:
    acquiring information indicating media types of each recording layer which each recording layer of the optical disc has, and information indicating the number of all recording layers which the optical disc has, from disc layer type identifier information and disc structure information recorded on a management information area on the optical disc, wherein the management information area is present on each recording layer of the optical disc; and
    recording information on the optical disc using laser light.

9. The recording method according to claim 8, comprising a step of acquiring information indicating the number of recording layers of each media type, from the disc layer type identifier information and the disc structure information recorded on the management information area on the optical disc.

10. An optical disc reproducing apparatus to reproduce information from an optical disc comprising:
    an objective lens to focus laser light;
    an actuator to drive the objective lens;
    a detector to detect reflected light from the optical disc;
    a signal generating module to generate a reproduced signal of information recorded on the optical disc, and an error signal for servo control from reflected light detected with the detector; and
    an actuator drive module to drive the actuator; wherein
        the optical disc has one or more first type layers, and one or more second type layers different from the first type layers,
        a management information area is present on each recording layer of the optical disc, the management information area is configured to
record information indicating whether the layer type
of each recording layer of the optical disc is the first
type layer or the second type layer,
the management information area is configured to record
information indicating the sum of the number of the first
type layers and the number of the second type layers, and
one layer among the first type layers is focused on by
driving the objective lens to acquire from the management information area on the one layer any of the information indicating whether the layer type of each recording layer of the optical disc is the first type or the second type, and the information indicating the sum of the number of the first type layers and the number of the second type layers.

* * * * *